United States Patent
Hashimoto et al.

(10) Patent No.: US 10,677,199 B2
(45) Date of Patent: Jun. 9, 2020

(54) ANOMALY DETERMINATION DEVICE FOR EVAPORATED FUEL PROCESSING DEVICE

(71) Applicant: MAZDA MOTOR CORPORATION, Hiroshima (JP)

(72) Inventors: Hidetoshi Hashimoto, Hiroshima (JP); Daisuke Tanaka, Hiroshima (JP); Yusuke Higuchi, Hiroshima (JP); Takayuki Kikuchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 112 days.

(21) Appl. No.: 16/086,274

(22) PCT Filed: Mar. 23, 2017

(86) PCT No.: PCT/JP2017/011764
§ 371 (c)(1),
(2) Date: Sep. 18, 2018

(87) PCT Pub. No.: WO2017/164320
PCT Pub. Date: Sep. 28, 2017

(65) Prior Publication Data
US 2020/0095957 A1    Mar. 26, 2020

(30) Foreign Application Priority Data
Mar. 23, 2016   (JP) ................................ 2016-058511

(51) Int. Cl.
*F02M 25/08*    (2006.01)
*F02D 41/00*    (2006.01)

(52) U.S. Cl.
CPC ...... *F02M 25/089* (2013.01); *F02M 25/0836* (2013.01); *F02D 41/004* (2013.01);
(Continued)

(58) Field of Classification Search
CPC ............... F02D 25/089; F02D 25/0836; F02D 25/0809; F02D 25/0854; F02D 41/004; F02D 41/0045; F02D 2200/0406
(Continued)

(56) References Cited

U.S. PATENT DOCUMENTS 5,979,418 A    11/1999   Saruwatari et al.
7,367,326 B2    5/2008   Shikama et al.
(Continued)

FOREIGN PATENT DOCUMENTS

| DE | 102014203923 A1 | 9/2014 |
|---|---|---|
| JP | 2000-045885 A | 2/2000 |
| JP | 2001-012313 A | 1/2001 |
| JP | 2013-160108 A | 8/2013 |

OTHER PUBLICATIONS

The extended European search report issued by the European Patent Office dated Jan. 29, 2019, which corresponds to European Patent Application No. 17770360.0-1004 and is related to U.S. Appl. No. 16/086,274.
(Continued)

*Primary Examiner* — Mahmoud Gimie
(74) *Attorney, Agent, or Firm* — Studebaker & Brackett PC

(57) ABSTRACT

An anomaly determination device for an evaporated fuel processing device comprises: an evaporated fuel processing device (60) including a canister (61), a purge passage (62) and a purge valve (66); a first pressure sensor (43) and/or a second pressure sensor (45) for acquiring a purge downstream pressure, a third pressure sensor (53) for acquiring a canister internal pressure, and a PCM (70) that calculates a purge flow rate per unit time based on the purge downstream pressure and an opening degree of the purge valve (66), and calculates an integrated purge flow rate by integrating the purge flow rate, so as to perform an anomaly determination
(Continued)

for the evaporated fuel processing device (60) based on the canister internal pressure and the integrated purge flow rate. The PCM (70) uses the canister internal pressure when the integrated purge flow rate becomes a predetermined flow rate or more.

10 Claims, 6 Drawing Sheets

(52) U.S. Cl.
CPC .. *F02D 41/0045* (2013.01); *F02D 2200/0406* (2013.01); *F02M 25/0809* (2013.01); *F02M 25/0854* (2013.01)

(58) Field of Classification Search
USPC ................................. 123/520, 516, 518, 519
See application file for complete search history.

(56) References Cited

U.S. PATENT DOCUMENTS

| | | |
|---|---|---|
| 2001/0027682 A1 | 10/2001 | Takagi et al. |
| 2013/0199504 A1 | 8/2013 | Takeishi et al. |
| 2014/0352658 A1 | 12/2014 | Jackson et al. |
| 2019/0048830 A1* | 2/2019 | Akiyama ............... F02M 35/10 |

OTHER PUBLICATIONS

International Search Report issued in PCT/JP2017/011764; dated Jun. 20, 2017.
Office Action corresponding to Japanese Patent Application No. 2016-058511; mailed by the Japanese Patent Office on Feb. 5, 2018.
International Preliminary Report on Patentability and Written Opinion issued in PCT/JP2017/011764; dated Sep. 25, 2018.

* cited by examiner

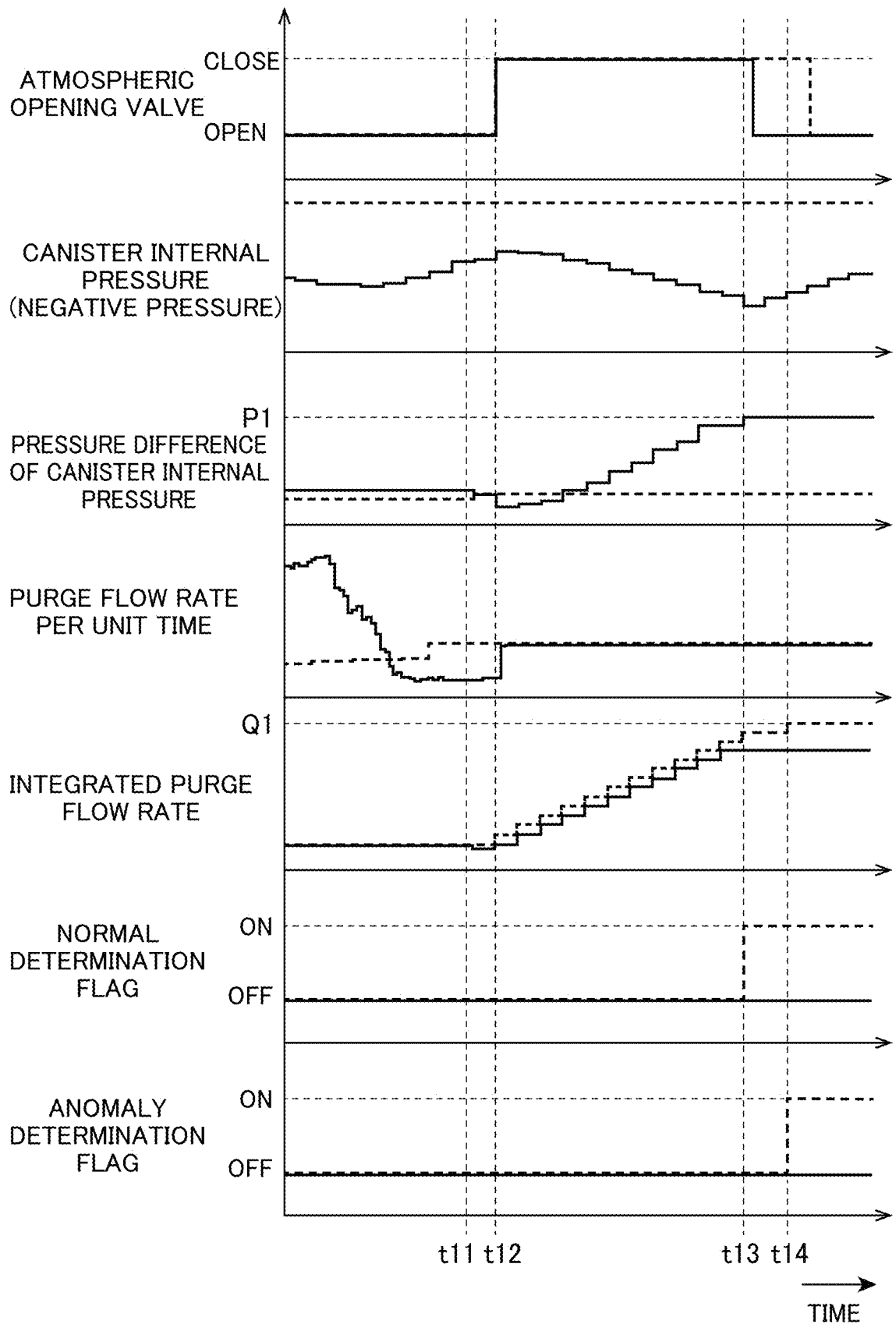

ANOMALY DETERMINATION DEVICE FOR EVAPORATED FUEL PROCESSING DEVICE

TECHNICAL FIELD

The present invention relates to an anomaly determination device for an evaporated fuel processing device for discharging (purging) evaporated fuel in a fuel tank to an intake passage of an engine.

BACKGROUND ART

Conventionally, there is known an evaporated fuel processing device (so-called evaporation purge system) in which evaporated fuel generated in a fuel tank is adsorbed by a canister once, and purge gas containing the evaporated fuel adsorbed by the canister is purged to an intake passage of an engine in response to a purge demand. Additionally, a technology of determining anomaly of such an evaporated fuel processing device is also known (refer to Patent Document 1, for example). This Patent Document 1 discloses a technology of determining that a purge valve is anomalous in a case where change of canister internal pressure during supply of purge gas to an intake passage is small (that is, during purge execution).

CITATION LIST

Patent Document

Patent Document 1: Japanese Patent Laid-Open No. 2000-045885

SUMMARY OF INVENTION

Technical Problem

The canister internal pressure during purge execution is changed depending on a purge flow rate that is a flow rate of purge gas purged from an evaporated fuel processing device to an intake passage. Basically, the larger the purge flow rate is, the more largely the canister internal pressure changes. In other words, in a case where the purge flow rate is small, the canister internal pressure does not change much. In the above technology described in Patent Literature 1, anomaly determination is performed on the basis of the change of the canister internal pressure. However, in a case where the canister internal pressure does not change much because of the small purge flow rate, there is a possibility that erroneous determination that the purge valve is anomalous is performed.

The present invention has been made in order to solve the above conventional technological problem, and an object of the present invention is to precisely perform anomaly determination for an evaporated fuel processing device on the basis of canister internal pressure in response to a purge flow rate.

Solution to Technical Problem

In order to attain the above object, the present invention is an anomaly determination device for an evaporated fuel processing device, including: an evaporated fuel processing device having: a canister operable to adsorb and accumulate evaporated fuel in a fuel tank; a purge passage operable to supply an intake passage with purge gas including the evaporated fuel accumulated in the canister; and a purge valve provided on the purge passage and operable to control a supply of the purge gas to the intake passage; a purge downstream pressure acquisition part configured to acquire a purge downstream pressure which is a pressure in the intake passage on a downstream side of the purge passage; a first purge flow rate calculation part configured to calculate a first purge flow rate which is a flow rate of purge gas per unit time purged to the intake passage by the evaporated fuel processing device, on the basis of the purge downstream pressure acquired by the purge downstream pressure acquisition part and an opening degree of the purge valve; a second purge flow rate calculation part configured to calculate a second purge flow rate which is a flow rate of purge gas continuously purged to the intake passage by the evaporated fuel processing device, based on the first purge flow rate calculated by the first purge flow rate calculation part; a canister internal pressure acquisition part configured to acquire a canister internal pressure which is an internal pressure of the canister; and an anomaly determination part configured to perform an anomaly determination for the evaporated fuel processing device on the basis of the second purge flow rate calculated by the second purge flow rate calculation part and the canister internal pressure acquired by the canister internal pressure acquisition part, wherein the second purge flow rate calculation part is configured to calculate a flow rate of purge gas continuously purged to the intake passage by the evaporated fuel processing device after a start of the anomaly determination, as the second purge flow rate, and wherein the anomaly determination part is configured to perform the anomaly determination on the basis of the canister internal pressure which is acquired by the canister internal pressure acquisition part when the second purge flow rate becomes a predetermined flow rate or more.

In the present invention thus configured, the flow rate (equivalent to a total amount) of the purge gas continuously purged after the start of the anomaly determination is calculated as the second purge flow rate from the first purge flow rate which is the flow rate of the purge gas per unit time, and the anomaly determination is performed on the basis of the canister internal pressure when this second purge flow rate becomes the predetermined flow rate or more. Consequently, taking the canister internal pressure in accordance with the purge flow rate into consideration, the anomaly determination is performed, and therefore it is possible to precisely perform the anomaly determination for the evaporated fuel processing device. For example, even in a case where the purge flow rate is small, the determination is performed on the basis of the canister internal pressure in accordance with this purge flow rate, and therefore it is possible to suitably suppress erroneous determination of the anomaly for the evaporated fuel processing device.

Preferably, in the present invention, the anomaly determination part is configured to determine that the evaporated fuel processing device is anomalous, in a case where a magnitude of a deviation between the canister internal pressure acquired by the canister internal pressure acquisition part at the time of the start of the anomaly determination, and the canister internal pressure acquired by the canister internal pressure acquisition part when the second purge flow rate becomes the predetermined flow rate or more is less than a predetermined pressure.

According to the present invention thus configured, taking the change amount of the canister internal pressure in accordance with the purge flow rate into consideration, the anomaly determination is performed, and therefore it is possible to more precisely perform the anomaly determination for the evaporated fuel processing device.

Preferably, in the present invention, the anomaly determination part is configured to determine that the evaporated fuel processing device is normal, even in a case where the second purge flow rate does not reach the predetermined flow rate, when the magnitude of the deviation between the canister internal pressure acquired by the canister internal pressure acquisition part at the time of the start of the anomaly determination, and the canister internal pressure acquired by the canister internal pressure acquisition part after the start of the anomaly determination becomes the predetermined pressure or more.

According to the present invention thus configured, the anomaly determination for the evaporated fuel processing device can be promptly terminated without waiting for the second purge flow rate to reach the predetermined flow rate.

Preferably, in the present invention, the predetermined pressure is preset on the basis of a change amount of the canister internal pressure when the purge gas of the predetermined flow rate is purged to the intake passage by the evaporated fuel processing device that is normal in a state where a residual amount of fuel in the fuel tank is substantially 0.

According to the present invention thus configured, the determination is performed by using the determination value (predetermined pressure) of the more suitable canister internal pressure in accordance with the purge flow rate, and therefore it is possible to reliably suppress erroneous determination of the anomaly for the evaporated fuel processing device.

Preferably, in the present invention, the evaporated fuel processing device is communicated with the canister, and further includes an atmospheric opening passage operable to supply air to the canister, and an atmospheric opening valve provided on the atmospheric opening passage and operable to control a supply of the air to the canister, and the anomaly determination part is configured to start the anomaly determination after the atmospheric opening valve is closed.

According to the present invention thus configured, at the time of the anomaly determination, the inflow of the air from the atmospheric opening passage to the canister is blocked, and therefore it is possible to effectively improve precision of the anomaly determination for the evaporated fuel processing device. That is, it is possible to improve robustness of the anomaly determination.

Preferably, in the present invention, the anomaly determination device for the evaporated fuel processing device is applied to an engine with a turbo supercharger including a compressor provided on the intake passage and a turbine provided on the exhaust passage, the evaporated fuel processing device includes an ejector that is connected to a compressor downstream side and a compressor upstream side of the intake passage, and generates a negative pressure by flow of intake air returned from the compressor downstream side to the compressor upstream side, the purge passage has a downstream end connected to the ejector, and purges the purge gas to the intake passage by utilizing the negative pressure generated by the ejector, and the anomaly determination part is configured to perform the anomaly determination when the purge gas is being purged to the intake passage from the purge passage through the ejector.

In the present invention thus configured, the anomaly determination is performed when the purge gas is being purged from the purge passage to the intake passage through the ejector. In principle, this purge by the ejector is performed at the time of supercharging by the turbo supercharger. Therefore, the anomaly determination is performed at the time of supercharging by the turbo supercharger. Generally, a series of supercharging period by the turbo supercharger is short (that is, supercharging/non-supercharging by the turbo supercharger tends to be relatively often switched), and therefore in a case where the anomaly determination for the purge by the ejector is performed, the anomaly determination needs to be completed for a short time.

According to the present invention, as described above, the second purge flow rate is sequentially calculated from the first purge flow rate, and a suitable predetermined flow rate is defined, the anomaly determination is performed on the basis of the canister internal pressure when the second purge flow rate becomes the predetermined flow rate or more, and therefore it is possible to suitably complete the anomaly determination in a relatively short supercharging period. Therefore, according to the present invention, it is possible to suitably perform the anomaly determination for the purge by the ejector.

Preferably, in the present invention, the anomaly determination device for the evaporated fuel processing device is applied to an engine with a turbo supercharger including a compressor provided on the intake passage, and a turbine provided on the exhaust passage, the evaporated fuel processing device includes an ejector that is connected to a compressor downstream side and a compressor upstream side of the intake passage, and generates a negative pressure by flow of intake air returned from the compressor downstream side to the compressor upstream side, the purge passage is branched into a first branch passage that has a downstream end connected to the ejector and purges the purge gas to the intake passage by utilizing the negative pressure generated by the ejector, and a second branch passage that has a downstream end connected to the intake passage on a further downstream side with respect to a position where the ejector is connected to the intake passage on the compressor downstream side, the second branch passage being operable to purge the purge gas to the intake passage by utilizing the negative pressure generated at the downstream end of the second branch passage, and the anomaly determination part is configured to perform the anomaly determination when the purge gas is being purged to the intake passage from the first branch passage through the ejector.

According to the present invention thus configured, in the evaporated fuel processing device configured to be able to perform the purge from the first branch passage through the ejector, and the purge from the second branch passage, when the purge is being performed through the ejector from the first branch passage, that is, at the time of supercharging by the turbo supercharger, it is possible to suitably perform the anomaly determination for the evaporated fuel processing device.

Preferably, in the present invention, the purge downstream pressure acquisition part acquires a first pressure that is a pressure in the downstream end of the first branch passage, and a second pressure that is a pressure in the downstream end of the second branch passage, as the purge downstream pressure, and the first purge flow rate calculation part is configured to calculate a branch part pressure that is a pressure in a branch part of the first branch passage and the second branch passage in the purge passage, on the basis of the first pressure and the second pressure, and to calculate the first purge flow rate on the basis of the branch part pressure, the opening degree of the purge valve and the canister internal pressure.

According to the present invention thus configured, in a system configured to purge from the first branch passage and the second branch passage, it is possible to precisely calculate the first purge flow rate.

Preferably, in the present invention, the second purge flow rate calculation part may be configured to calculate the second purge flow rate by integrating the first purge flow rate calculated by the first purge flow rate calculation part.

Effect of Invention

According to an anomaly determination device for an evaporated fuel processing device of the present invention, it is possible to precisely perform anomaly determination for an evaporated fuel processing device on the basis of canister internal pressure in response to a purge flow rate.

BRIEF DESCRIPTION OF DRAWINGS

FIG. 6 is a time chart in a case where an anomaly determination process of the evaporated fuel processing device according to the embodiment is performed.

DESCRIPTION OF EMBODIMENTS

Hereinafter, an anomaly determination device for an evaporated fuel processing device according to an embodiment of the present invention will be described with reference to the attached drawings.
<System Configuration>

Figure 1:
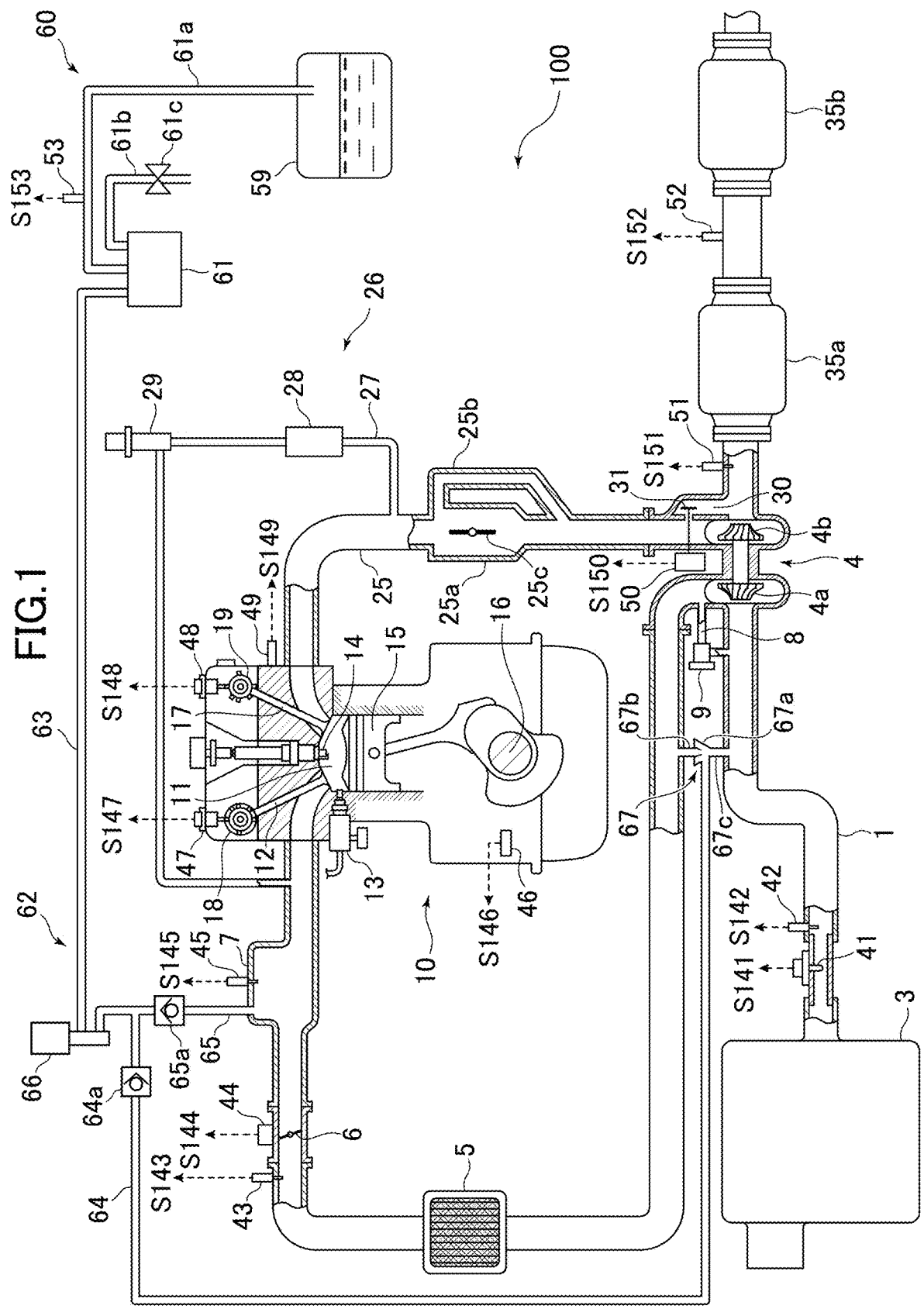
FIG. 1 is a schematic configuration diagram of an engine system to which an anomaly determination device for an evaporated fuel processing device according to an embodiment of the present invention is applied.

Now, an engine system to which an anomaly determination device for an evaporated fuel processing device according to an embodiment of the present invention is applied will be described with reference to FIG. 1 and FIG. 2. FIG. 1 is a schematic configuration diagram of the engine system to which the anomaly determination device for an evaporated fuel processing device according to the embodiment of the present invention is applied, and FIG. 2 is a block diagram illustrating an electric configuration of the anomaly determination device for an evaporated fuel processing device according to the embodiment of the present invention.

Figure 2:
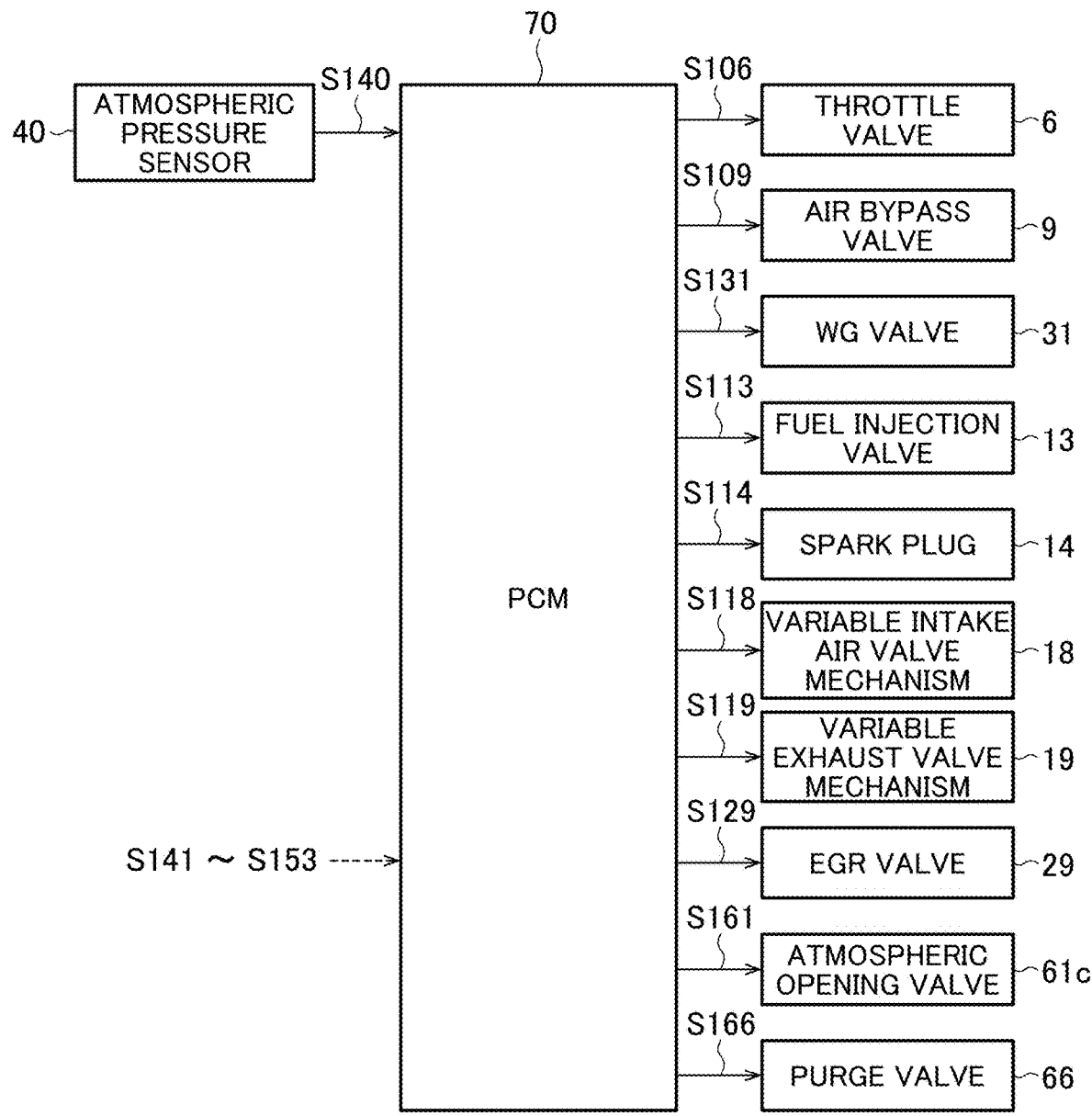
FIG. 2 is a block diagram illustrating an electric configuration of the anomaly determination device for an evaporated fuel processing device according to the embodiment of the present invention.

As illustrated in FIG. 1 and FIG. 2, an engine system 100 mainly has an intake passage 1 through which intake air (air) introduced from outside passes, an engine 10 (specifically, gasoline engine) that burns fuel-air mixture of intake air supplied from this intake passage 1, and fuel supplied from a fuel injection valve 13 described below in cylinders, and generates power of a vehicle, an exhaust passage 25 that discharges exhaust gas generated by burning in this engine 10, sensors 40 to 53 that detect various states regarding the engine system 100, and a PCM 70 that controls a whole of the engine system 100. Although only one cylinder is illustrated in FIG. 1, the engine 10 actually has a plurality of cylinders (two or more cylinders).

In the intake passage 1, an air cleaner 3 that purifies intake air introduced from outside, a compressor 4a for a turbo supercharger 4 that boosts intake air that passes, an intercooler 5 that cools intake air by outside air or cooling water, a throttle valve 6 that regulates an amount of intake air that passes (intake air amount), and a surge tank 7 that temporarily stores intake air to be supplied to the engine 10 are provided in this order from an upstream side.

In the intake passage 1, an air bypass passage 8 for returning a part of intake air supercharged by compressor 4a to the upstream side of the compressor 4a is provided. Specifically, an end of the air bypass passage 8 is connected to the intake passage 1 on the downstream side of the compressor 4a and on the upstream side of the throttle valve 6, and the other end of the air bypass passage 8 is connected to the intake passage 1 on the downstream side of the air cleaner 3 and on the upstream side of the compressor 4a.

In this air bypass passage 8, an air bypass valve 9 that regulates the flow rate of intake air flowing through the air bypass passage 8 by opening/closing operation is provided. The air bypass valve 9 is a so-called on-off valve capable of switching the air bypass passage 8 between a closed state in which the air bypass passage 8 is completely closed, and an open state in which the air bypass passage 8 is completely open.

The engine 10 mainly has an intake air valve 12 that introduces intake air supplied from the intake passage 1 into a combustion chamber 11, the fuel injection valve 13 that injects fuel toward the combustion chamber 11, a spark plug 14 that ignites fuel-air mixture of the intake air supplied into the combustion chamber 11, and fuel, a piston 15 that reciprocates by burning of the fuel-air mixture in the combustion chamber 11, a crank shaft 16 rotated by the reciprocation of the piston 15, and an exhaust valve 17 that discharges exhaust gas generated by burning of the fuel-air mixture in the combustion chamber 11 to the exhaust passage 25.

In the engine 10, operation timing (that is, opening/closing timing) of each of the intake air valve 12 and the exhaust valve 17 is variably configured by a variable intake air valve mechanism 18 and a variable exhaust valve mechanism 19 as a variable valve timing mechanism. As the variable intake air valve mechanism 18 and the variable exhaust valve mechanism 19, various known types are applicable. For example, operation timing of each of the intake air valve 12 and the exhaust valve 17 can be changed by using a mechanism constituted as a solenoid type or a hydraulic type.

In the exhaust passage 25, a turbine 4b of the turbo supercharger 4 that is rotated by passing exhaust gas, and drives the compressor 4a by this rotation, and catalytic devices 35a, 35b that have purification functions of exhaust gas such as a NOx catalyst, a three way catalyst, and an oxidation catalyst are provided in this order from the upstream side. Hereinafter, in a case where these catalytic devices 35a, 35b are used without being distinguished, the catalytic devices 35a, 35b are simply written as "catalytic devices 35".

On the exhaust passage 25, an EGR device 26 that returns a part of exhaust gas as EGR gas to the intake passage 1 is provided. The EGR device 26 has an EGR passage 27 having an end connected to the exhaust passage 25 on the upstream side of the turbine 4b, and the other end connected to the intake passage 1 on the downstream side of the compressor 4a and on the downstream side of the throttle valve 6, an EGR cooler 28 that cools EGR gas, and an EGR valve 29 that controls an EGR gas amount (flow rate) flowing through the EGR passage 27. This EGR device 26 is equivalent to a so-called high-pressure EGR device (HPL (High Pressure Loop) EGR device).

In the exhaust passage 25, a turbine bypass passage 30 that bypasses exhaust gas without allowing the exhaust gas to passing through the turbine 4b of the turbo supercharger 4 is provided. In this turbine bypass passage 30, a waste gate valve (hereinafter referred to as a "WG valve") 31 that controls the flow rate of the exhaust gas flowing through the turbine bypass passage 30 is provided.

In the exhaust passage 25, a passage between a connecting portion on the upstream side of the EGR passage 27, and a connecting portion on the upstream side of the turbine bypass passage 30 is branched into a first passage 25a and a second passage 25b. The first passage 25a has a larger diameter than that of the second passage 25b. In other words, the second passage 25b has a smaller diameter than that of the first passage 25a, and an on-off valve 25c is provided in the first passage 25a. In a case where the on-off valve 25c is opened, exhaust gas basically flows in the first passage 25a, and in a case where the on-off valve 25c is closed, exhaust gas flows only in the second passage 25b. Therefore, the flow velocity of exhaust gas in the case where the on-off valve 25c is closed is larger than the flow velocity of exhaust gas in the case where the on-off valve 25c is open. The on-off valve 25c is closed in a low rotation region, and exhaust gas having the increased flow velocity is supplied to the turbine 4b of the turbo supercharger 4, and even in the low rotation region, supercharging by the turbo supercharger 4 can be performed.

Furthermore, the engine system 100 has an evaporated fuel processing device 60 (evaporation purge system). This evaporated fuel processing device 60 has a canister 61 that adsorbs and stores evaporated fuel generated in a fuel tank 59, a purge passage 62 that connects the canister 61 with the intake passage 1, and guides purge gas containing evaporated fuel from the canister 61 to the intake passage 1, and a purge valve 66 provided in the purge passage 62.

In the canister 61, activated carbon that detachably adsorbs fuel vapor is housed. In the canister 61, a fuel vapor introduction passage 61a that introduces fuel vapor in the fuel tank 59, an atmospheric opening passage 61b that opens the canister 61 to the atmosphere, and the purge passage 62 are connected. On the atmospheric opening passage 61b, an atmospheric opening valve 61c that closes and opens the atmospheric opening passage 61b, and an air filter (not illustrated) that filters air which flows into the canister 61 are provided. Basically, the atmospheric opening valve 61c is opened when the evaporated fuel is purged.

A portion on the upstream side of the purge passage 62 is formed by a single passage (common passage 63), and is connected to the canister 61. On the other hand, a portion on the downstream side of the purge passage 62 is branched into two passages (a first branch passage 64 and a second branch passage 65), and is connected to two portions of the intake passage 1.

More specifically, the purge passage 62 has the common passage 63 on the upstream side, and the first branch passage 64 and the second branch passage 65 on the downstream side. An upstream end of the common passage 63 is connected to the canister 61. An upstream end of the first branch passage 64, and an upstream end of the second branch passage 65 are connected to a downstream end of the common passage 63. A downstream end of the first branch passage 64 is connected to a portion on the upstream side of the compressor 4a in the intake passage 1 through an ejector 67 described below. A downstream end of the second branch passage 65 is connected to the surge tank 7 of the intake passage 1.

In the common passage 63, the purge valve 66 is provided. This purge valve 66 is an electronically controlled valve that is opened/closed by a control signal from the PCM 70. In the first branch passage 64, a check valve 64a that prevents backward flow of intake air from the intake passage 1 is provided. In the second branch passage 65, a check valve 65a that prevents backward flow of intake air from the intake passage 1 is provided.

The ejector 67 has a body 67a, an introduction nozzle 67b that connects a portion on the downstream side of the intake passage 1 with respect to the compressor 4a, and the body 67a, and a discharge passage 67c that connects a portion on the upstream side of the intake passage 1 with respect to the compressor 4a, and the body 67a. The first branch passage 64 is connected to the body 67a of the ejector 67. A tip of the introduction nozzle 67b is tapered, and intake air returned through the introduction nozzle 67b is decompressed by the tip portion, and negative pressure is generated around the tip of the introduction nozzle 67b. By this negative pressure, purge gas is sucked into the body 67a from the first branch passage 64. The sucked purge gas is introduced to the upstream side of the intake passage 1 with respect to the compressor 4a through the discharge passage 67c, together with the intake air returned from the introduction nozzle 67b.

When the turbo supercharger 4 does not supercharge intake air (at the time of non-supercharging), purge gas is introduced to the intake passage 1 through the second branch passage 65. More specifically, at the time of the non-supercharging, the pressure on the upstream side of the compressor 4a of the intake passage 1 is higher than the pressure on the downstream side of the compressor 4a, and therefore return of intake air through the ejector 67 is not generated. Therefore, the pressure in the downstream end of the first branch passage 64 becomes the pressure in a portion connected to the ejector 67 in the intake passage 1, and this pressure is equal to the atmospheric pressure. The canister 61 is opened to the atmospheric pressure, and therefore differential pressure between the upstream end and the downstream end of the first branch passage 64 is substantially zero, and purge gas does not circulate through the first branch passage 64.

On the other hand, the pressure in the surge tank 7 connected to the downstream end of the second branch passage 65 becomes negative pressure. Therefore, purge gas that circulates through the purge passage 62 is introduced to the surge tank 7 through the second branch passage 65.

When the turbo supercharger 4 supercharges intake air (at the time of supercharging), purge gas is introduced to the intake passage 1 through the first branch passage 64. More specifically, at the time of supercharging, the pressure in the surge tank 7 becomes positive pressure by supercharging. As described above, the canister 61 is opened to atmospheric pressure, and therefore the pressure in the downstream end of the second branch passage 65 becomes higher than the pressure in the upstream end of the second branch passage 65. Therefore, the purge gas does not circulate through the second branch passage 65. In the second branch passage 65, the check valve 65a is provided, and therefore the intake air in the intake passage 1 does not inversely enter the second branch passage 65.

On the other hand, by the supercharging by the compressor 4a, the pressure on the downstream side of the compressor 4a of the intake passage 1 is higher than the pressure on the upstream side of the compressor 4a, and therefore return of intake air through the ejector 67 is generated. Consequently, purge gas is sucked from the first branch passage 64, and the sucked purge gas is introduced to the upstream side of the compressor 4a of the intake passage 1. Thus, the purge gas that circulates through the purge passage 62 is introduced to the intake passage 1 through the first branch passage 64.

At a transient time such as right after supercharging start and right after supercharging stop, the purge gas from the first branch passage 64 is sucked by the ejector 67, and the purge gas can be introduced from the second branch passage 65 to the surge tank 7 by the negative pressure of the surge tank 7. That is, the purge gas can be supplied to the intake passage 1 through both the first branch passage 64 and the second branch passage 65.

Even in any of cases of the supercharging, the non-supercharging, and the transient time, the purge flow rate that is the flow rate of the purge gas circulating through the purge passage 62 is regulated by the purge valve 66.

Hereinafter, to purge gas to the intake passage 1 from the first branch passage 64 through the ejector 67 is appropriately referred to as an "ejector purge", and to purge gas to the intake passage 1 in the vicinity of an intake manifold from the second branch passage 65 is appropriately referred to as "intake manifold purge".

As illustrated in FIG. 1 and FIG. 2, sensors 40 to 53 that detect various states regarding the engine system 100 are provided in the engine system 100. These sensors 40 to 53 specifically are as follows. The atmospheric pressure sensor 40 detects the atmospheric pressure. An air flow sensor 41 detects an intake air amount equivalent to the flow rate of intake air which passes through the intake passage 1 between the air cleaner 3 and the compressor 4a. A temperature sensor 42 detects the temperature of the intake air which passes through the intake passage 1 between the air cleaner 3 and the compressor 4a. A first pressure sensor 43 detects supercharging pressure. A throttle opening degree sensor 44 detects a throttle opening degree that is the opening degree of the throttle valve 6. A second pressure sensor 45 detects intake manifold pressure (pressure in the surge tank 7) equivalent to the pressure of intake air to be supplied to the engine 10. A crank angle sensor 46 detects the crank angle in the crank shaft 16. An intake air side cam angle sensor 47 detects the cam angle of an intake air cam shaft. An exhaust side cam angle sensor 48 detects the cam angle of an exhaust cam shaft. A temperature sensor 49 detects the temperature (water temperature) of cooling water of the engine 10. A WG opening degree sensor 50 detects the opening degree of a WG valve 31. An O$_2$ sensor 51 detects the concentration of oxygen in exhaust gas on the upstream side of the catalytic device 35a, and an O$_2$ sensor 52 detects the concentration of oxygen in exhaust gas between the catalytic devices 35a and the catalytic devices 35b. A third pressure sensor 53 is provided on the fuel vapor introduction passage 61a, and detects the internal pressure of the canister 61 (canister internal pressure). The canister internal pressure detected by this third pressure sensor 53 is basically equivalent to the internal pressure of the fuel tank 59. These various sensors 40 to 53 output detection signals S140 to S153 corresponding to respective detected parameters to the PCM 70.

The PCM 70 controls components in the engine system 100 on the basis of the detection signals S140 to S153 input from the above various sensors 40 to 53. Specifically, as illustrated in FIG. 2, the PCM 70 supplies a control signal S106 to the throttle valve 6, controls the opening/closing timing or the throttle opening degree of the throttle valve 6, supplies a control signal S109 to the air bypass valve 9, controls the opening/closing of the air bypass valve 9, supplies a control signal S131 to the WG valve 31, controls the opening degree of the WG valve 31, supplies a control signal S113 to the fuel injection valve 13, controls a fuel injection amount and fuel injection timing, supplies a control signal S114 to the spark plug 14, controls ignition timing, supplies control signals S118, S119 to the variable intake air valve mechanism 18 and the variable exhaust valve mechanism 19, respectively, controls the operation timing of each of the intake air valve 12 and the exhaust valve 17, supplies a control signal S129 to the EGR valve 29, controls the opening degree of the EGR valve 29, supplies a control signal S161 to the atmospheric opening valve 61c, controls the opening/closing of the atmospheric opening valve 61c, supplies a control signal S166 to the purge valve 66, and controls the opening degree of the purge valve 66.

Particularly, in this embodiment, the PCM 70 performs a process for determining the anomaly of the evaporated fuel processing device 60 (for example, leakage of purge gas or the like in the evaporated fuel processing device 60, or malfunction of various valves, or the like). In this embodiment, when the PCM 70 basically performs purge during supercharging, that is, when purge gas is being supplied to the intake passage 1 from the first branch passage 64 through the ejector 67 (namely, during ejector purge), the anomaly determination for the evaporated fuel processing device 60 is performed. In this case, the PCM 70 calculates a purge flow rate by the evaporated fuel processing device 60, and performs anomaly determination based on whether or not canister internal pressure when this purge flow rate becomes a predetermined flow rate or more becomes canister internal pressure assumed in a case where purge gas is purged at the predetermined flow rate. While details will be described below, the PCM 70 functions as a "purge downstream pressure acquisition part", a "first purge flow rate calculation part", a "second purge flow rate calculation part", a "canister internal pressure acquisition part" and an "anomaly determination part" in the present invention.

The components of the PCM 70 are composed of a computer including a CPU (i.e., one or more processors), various programs (including a basic control program such as an OS, and an application program which is activated on the OS, and realizes a specific function) interpreted and executed on the CPU, and an internal memory such as a ROM and a RAM for storing a program and various data.

<Anomaly Determination Process of Evaporated Fuel Processing Device>

Figure 3:
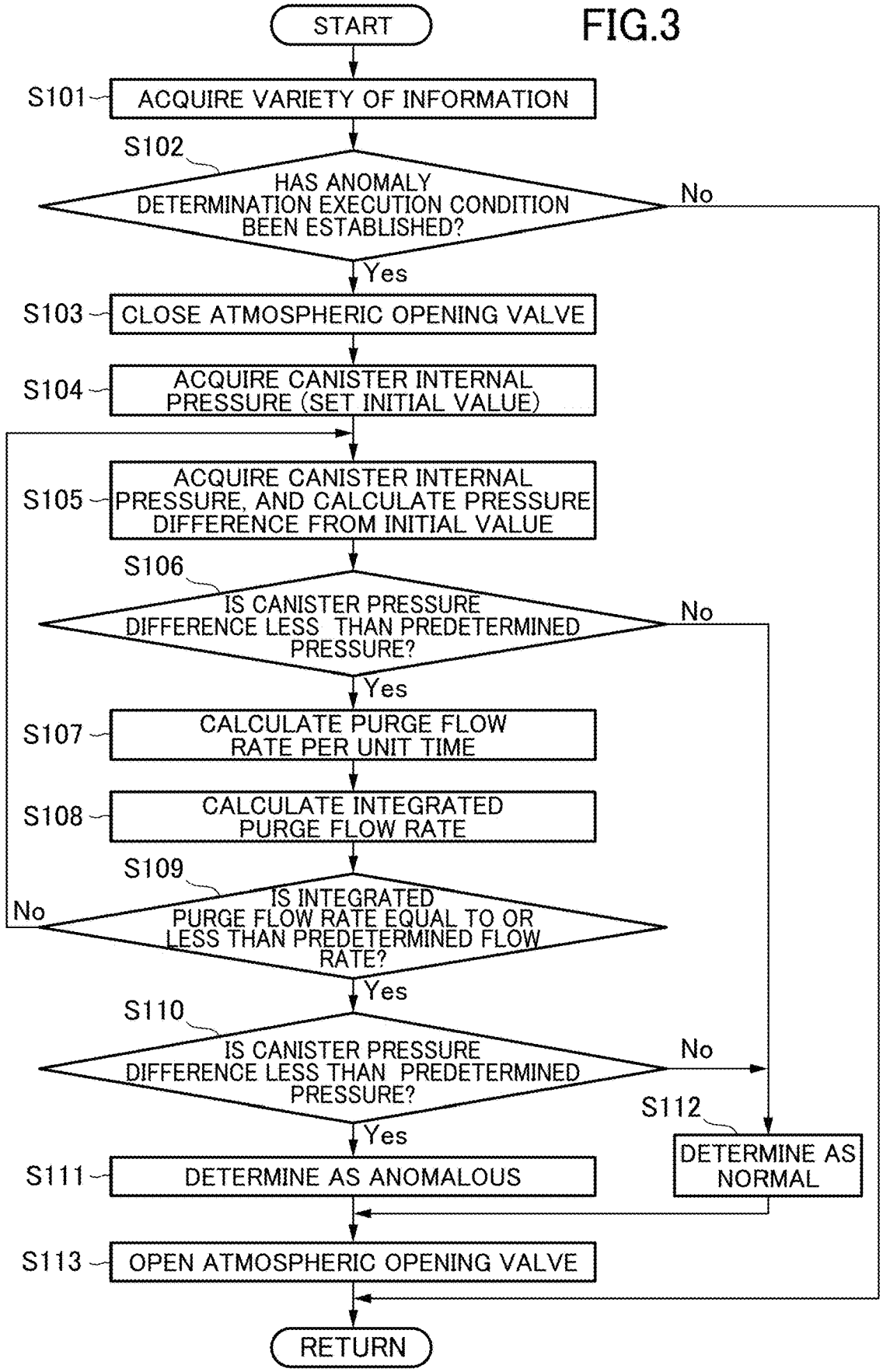
FIG. 3 is a flowchart illustrating an anomaly determination process of an evaporated fuel processing device according to the embodiment of the present invention.

Now, an anomaly determination process for the evaporated fuel processing device according to the embodiment of the present invention will be described with reference to FIG. 3. FIG. 3 is a flowchart illustrating the anomaly determination process for the evaporated fuel processing device according to the embodiment of the present invention. This process is repeatedly performed in a predetermined cycle by the PCM 70.

First, a summary of the anomaly determination process for the evaporated fuel processing device according to this embodiment will be described. In this anomaly determination process, the PCM 70 performs the anomaly determination for the evaporated fuel processing device 60 at least during ejector purge, canister internal pressure detected by the third pressure sensor 53 is acquired at the time of start of this anomaly determination, and this canister internal pressure is held as an initial value. The PCM 70 repeatedly calculates a purge flow rate per unit time on the basis of pressure detected by the first pressure sensor 43 or the second pressure sensor 45, and the opening degree of the purge valve 66, during anomaly determination, and calculates an integrated purge flow rate by integrating the purge flow rate per unit time thus calculated. When the integrated purge flow rate becomes the predetermined flow rate or more, the PCM 70 obtains a pressure difference (deviation) between canister internal pressure detected by the third pressure sensor 53 at this time, and the initial value of the canister internal pressure, and determines that the evaporated fuel processing device 60 is anomalous in a case where the magnitude (absolute value) of this pressure difference is less than a predetermined pressure.

A flow of the anomaly determination process of FIG. 3 will be specifically described. First, in Step S101, the PCM 70 acquires a variety of information in a vehicle. Particularly, the PCM 70 acquires pressure (supercharging pressure) detected by the first pressure sensor 43, pressure (intake manifold pressure) detected by the second pressure sensor 45, canister internal pressure detected by the third pressure sensor 53, atmospheric pressure detected by the atmospheric pressure sensor 40, and the like.

Then, in Step S102, the PCM 70 determines whether or not an anomaly determination execution condition of the evaporated fuel processing device 60 is established. Specifically, the PCM 70 determines that the anomaly determination execution condition is established, in a case where a current state is a supercharging state in which supercharge is being performed by the turbo supercharger 4, and purge gas whose flow rate is sufficient to suitably perform anomaly determination is being purged. In this case, the PCM 70 determines, for example, on the basis of the magnitude of pressure acquired by the first pressure sensor 43 whether or not the current state is the supercharging state. Additionally, the PCM 70 obtains a current purge flow rate on the basis of pressure detected by each of the first pressure sensor 43 and the second pressure sensor 45, the opening degree of the purge valve 66, and the like, and determines whether or not this purge flow rate is a flow rate (preset) required for performing the anomaly determination, or more.

As indicated that the anomaly determination execution condition of Step S102 includes the supercharging state as a condition, the anomaly determination process for the evaporated fuel processing device 60 according to this embodiment is basically performed at the time of supercharging, that is, performed during the ejector purge. However, the present invention is not limited to the case where the anomaly determination process is performed when only the ejector purge is being performed, and the anomaly determination process may be performed when the intake manifold purge is performed in addition to the ejector purge. As described above, at a transient time such as right after supercharging start and right after supercharging stop, both the ejector purge and the intake manifold purge are performed, and the anomaly determination process may be performed at such a transient time of supercharging.

In a case where it is determined that the anomaly determination execution condition is established (Step S102: Yes), the PCM 70 goes to Step S103. Additionally, in a case where it is not determined that the anomaly determination execution condition is established (Step S102: No), the PCM 70 terminates the anomaly determination process.

In Step S103, the PCM 70 closes the atmospheric opening valve 61c, and blocks inflow of air from the atmospheric opening passage 61b to the canister 61. Then, in Step S104, the PCM 70 acquires canister internal pressure detected by the third pressure sensor 53, and sets this canister internal pressure as an initial value.

Thereafter, in Step S105 and subsequent steps, a specific process for performing the anomaly determination for the evaporated fuel processing device 60 is performed. First, in Step S105, the PCM 70 acquires the canister internal pressure detected by the third pressure sensor 53, and calculates a pressure difference (absolute value) between this canister internal pressure, and the initial value of the canister internal pressure set in Step S104. Then, in Step S106, the PCM 70 determines whether or not the pressure difference of the canister internal pressure calculated in Step S105 is less than a predetermined pressure.

As a result of the determination of Step S106, in a case where it is determined that the pressure difference of the canister internal pressure is less than the predetermined pressure (Step S106: Yes), the process advances to Step S107. On the other hand, in a case where it is not determined that the pressure difference of the canister internal pressure is less than the predetermined pressure (Step S106: No), that is, in a case where the pressure difference of the canister internal pressure is the predetermined pressure or more, the process advances to Step S112. In this case, it can be said that the canister internal pressure suitably changes by the purge by the evaporated fuel processing device 60, and therefore the PCM 70 determines that the evaporated fuel processing device 60 is normal regardless of the magnitude of an integrated purge flow rate described below (particularly, even when the integrated purge flow rate does not reach a predetermined flow rate) (Step S112). For example, the PCM 70 determines that leakage of purge gas or the like in the evaporated fuel processing device 60, malfunction of various valves, or the like is not generated.

Figure 4:
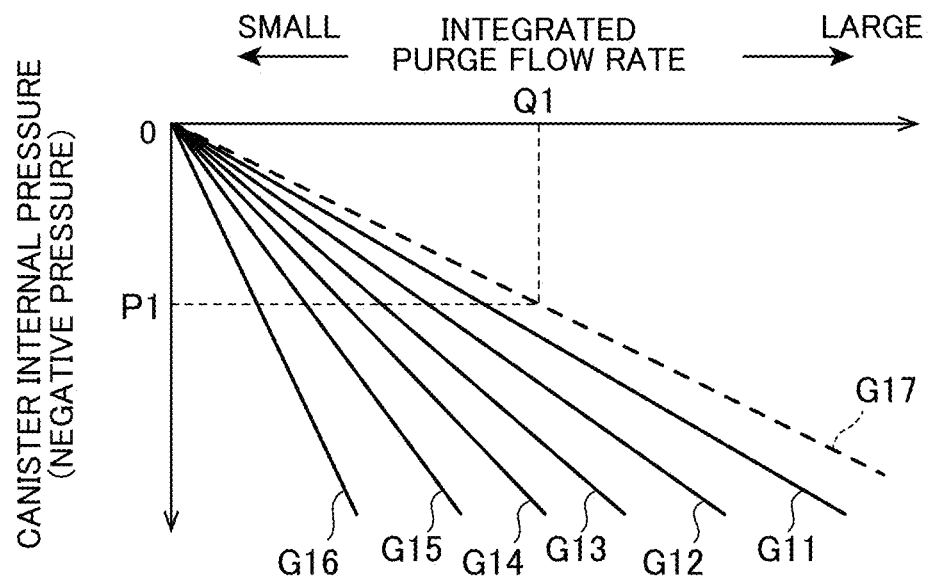
FIG. 4 illustrates change of canister internal pressure to an integrated purge flow rate, as to various residual degrees of fuel in a fuel tank.

Herein, the predetermined pressure used for determining the pressure difference of the canister internal pressure in the above Step S106 (including Step S110 described below) will be described with reference to FIG. 4. FIG. 4 illustrates change of canister internal pressure to a flow rate at which purge gas is purged, as to various residual degrees of fuel in the fuel tank 59. Specifically, in FIG. 4, the integrated purge flow rate is illustrated in a horizontal axis, the canister internal pressure (negative pressure) is illustrated in a vertical axis. Reference numeral G11 indicates a graph in a case where the residual degree of the fuel tank 59 is 0% (that is, equivalent to a state in which the fuel tank 59 is empty), reference numeral G12 indicates a graph in a case where the residual degree of the fuel tank 59 is 20%, reference numeral G13 indicates a graph in a case where the residual degree of the fuel tank 59 is 40%, reference numeral G14 indicates a graph in a case where the residual degree of the fuel tank 59 is 60%, reference numeral G15 indicates a graph in a case where the residual degree of the fuel tank 59 is 80%, and reference numeral G16 indicates a graph in a case where the residual degree of the fuel tank 59 is 100% (that is, equivalent to a state in which the fuel tank 59 is full).

As illustrated in FIG. 4, it is found that the larger the integrated purge flow rate is, the larger the change amount of the canister internal pressure is. Additionally, it is found that the larger the residual degree of the fuel tank 59 is, the larger the change rate (inclination) of the canister internal pressure to change of the integrated purge flow rate becomes. In this embodiment, the above predetermined pressure for determining the pressure difference of the canister internal pressure is defined, by using relation between the integrated purge flow rate and the canister internal pressure in the case where the residual degree of the fuel tank 59 is 0% (refer to graph G11), that is, these relation in the residual degree of the fuel tank 59 at which the change rate of the canister internal pressure to the change of the integrated purge flow rate becomes the smallest. Specifically, the predetermined pressure is defined by using relation as illustrated by reference numeral G17, obtained by applying a certain degree of margin to relation between the integrated purge flow rate and the canister internal pressure in the case where the residual degree of the fuel tank 59 is 0%. For example, in the graph illustrated in reference numeral G17, an integrated purge flow rate Q1 is set as a predetermined flow rate, and canister internal pressure P1 corresponding to this integrated purge flow rate Q1 is set as the predetermined pressure. In this case, for example, a moderate flow rate enabling precise anomaly determination, and enabling termination of the anomaly determination for a relatively short time is preferably applied to the predetermined flow rate Q1 of the integrated purge flow rate.

The present invention is not limited to fixing of the predetermined flow rate of the integrated purge flow rate which defines the predetermined pressure of the canister internal pressure. For example, the anomaly determination process may be performed for a predetermined time, and an integrated purge flow rate after the elapse of the predetermined time from start of the anomaly determination process may be treated as the predetermined flow rate, canister internal pressure corresponding to this predetermined flow rate may be obtained from the graph illustrated by the reference numeral G17, and this canister internal pressure may be set as the predetermined pressure.

Returning to FIG. 3, Step S107 and subsequent processes will be described. In Step S107, the PCM 70 calculates a purge flow rate per unit time by the evaporated fuel processing device 60 (equivalent to a first purge flow rate). A calculation method of this purge flow rate per unit time will be described in detail in the following section. Basically, the PCM 70 calculates the purge flow rate per unit time through the first branch passage 64 in accordance with general Bernoulli's theorem on the basis of a physical property value of flow passage resistance or the like of the first branch passage 64, the pressure on the upstream side of the first branch passage 64, and the opening degree of the purge valve 66, in a case where only the ejector purge is performed. In this case, the PCM 70 estimates the pressure on the downstream side of the first branch passage 64 on the basis of a pressure difference between the pressure on the upstream side of the compressor 4*a* (atmospheric pressure detected by the atmospheric pressure sensor 40), and the pressure on the downstream side of the compressor 4*a* (supercharging pressure detected by the first pressure sensor 43), by using the canister internal pressure as the pressure on the upstream side of the first branch passage 64.

In Step S108, the PCM 70 calculates an integrated purge flow rate from the purge flow rate per unit time calculated in Step S107 (equivalent to a second purge flow rate). Specifically, the PCM 70 adds the purge flow rate per unit time calculated this time in Step S107 to the integrated purge flow rate previously calculated in Step S108 to calculate an integrated purge flow rate this time.

In Step S109, the PCM 70 determines whether or not the integrated purge flow rate calculated in Step S108 is a predetermined flow rate or more. For example, to this predetermined flow rate, the flow rate Q1 illustrated in FIG. 4 is applied. In a case where it is determined that the integrated purge flow rate is the predetermined flow rate or more as a result of the determination in Step S109 (Step S109: Yes), the process advances to Step S110. On the other hand, in a case where it is not determined that the integrated purge flow rate is the predetermined flow rate or more (Step S109: No), that is, in a case where the integrated purge flow rate is less than the predetermined flow rate, the process returns to Step S105, and the PCM 70 performs the above process of Step S105, and the subsequence processes again. That is, the PCM 70 repeatedly performs the processes of Steps S105 to S109 until the integrated purge flow rate becomes the predetermined flow rate or more. However, in a case where the pressure difference of the canister internal pressure becomes the predetermined pressure or more during this loop (Step S106: No), the PCM 70 escapes this loop, goes to Step S112, and determines that the evaporated fuel processing device 60 is normal.

In Step S110, the PCM 70 obtains pressure difference (absolute value) between the canister internal pressure acquired this time, and the initial value of the canister internal pressure set in Step S103, and determines whether or not this pressure difference is less than the predetermined pressure. For example, to this predetermined pressure, pressure according to the canister internal pressure P1 illustrated in FIG. 4 is applied. In a case where it is determined that the pressure difference of the canister internal pressure is less than the predetermined pressure as a result of the determination of Step S110 (Step S110: Yes), the process advances to Step S111. In this case, the canister internal pressure does not suitably change by purge by the evaporated fuel processing device 60, and therefore the PCM 70 determines that the evaporated fuel processing device 60 is anomalous (Step S111). For example, the PCM 70 determines that leakage of purge gas or the like in the evaporated fuel processing device 60, malfunction of various valves, or the like is generated. On the other hand, in a case where it is not determined that the pressure difference of the canister internal pressure is less than the predetermined pressure (Step S110: No), that is, in a case where the pressure difference of the canister internal pressure is the predetermined pressure or more, the process advances to Step S112, and the PCM 70 determines that the evaporated fuel processing device 60 is normal.

After the above Step S111 or S112, the process advances to Step S113, and the PCM 70 opens the atmospheric opening valve 61*c*, and opens the canister 61 to the atmosphere.

<Purge Flow Rate Calculation Method>

Now, the calculation method of the purge flow rate according to the embodiment of the present invention will be specifically described. This method is applied in the above Step S107 of FIG. 3.

In this embodiment, the PCM 70 obtains branch part pressure that is the pressure of a branch part of the first branch passage 64 and the second branch passage 65 in the purge passage 62, and calculates a purge flow rate per unit time on the basis of the branch part pressure. This branch part pressure is calculated as follows. In the following description, a total purge flow rate which circulates through the purge passage 62 is denoted by "Qpg", the branch part pressure is denoted by "Ppg", an ejector purge flow rate which is the purge flow rate of the first branch passage 64 is denoted by "Qej", first pressure which is the pressure in the downstream end of the first branch passage 64 is denoted by "Pej", the intake manifold purge flow rate which is the purge flow rate of the second branch passage 65 is denoted by "Qim", and second pressure which is the pressure in the downstream end of the second branch passage 65 is denoted by "Pim".

First, an ejector purge flow rate Qej depends on a pressure difference between the upstream end and the downstream end of the first branch passage 64, and is expressed by the following Equation (1), where K1 denotes a constant obtained by collecting physical property values such as the flow passage resistance of the first branch passage 64.

$$Qej = K1 \times \sqrt{(Ppg - Pej)} \quad \text{Equation (1)}$$

Similarly, the intake manifold purge flow rate Qim depends on a pressure difference between the upstream end and the downstream end of the second branch passage 65, and is expressed by the following Equation (2), where K2 denotes a constant obtained by collecting physical property values such as the flow passage resistance of the second branch passage 65.

$$Qim = K2 \times \sqrt{(Ppg - Pim)} \quad \text{Equation (2)}$$

The total purge flow rate Qpg is the total of the ejector purge flow rate Qej and the intake manifold purge flow rate Qim, and is expressed by the following Equation (3).

$$Qpg = Qej + Qim \quad \text{Equation (3)}$$

When Equations (1) and (2) are transformed, the respective equations become the following Equations (4) and (5).

$$Ppg = (Qej/K1)^2 + Pej \quad \text{Equation (4)}$$

$$Ppg = (Qim/K2)^2 + Pim \quad \text{Equation (5)}$$

Furthermore, when Equations (4) and (5) are collected, the following Equation (6) is derived.

$$(Qej/K1)^2 + Pej = (Qim/K2)^2 + Pim \quad \text{Equation (6)}$$

Herein, when the total purge flow rate Qpg in Equation (3) is denoted by qprg which is a target purge flow rate, and the ejector purge flow rate Qej is solved, the following Equation (7) is established.

$$Qej = qprg - Qim \quad \text{Equation (7)}$$

When this Equation (7) is substituted into Equation (6), Equation (6) becomes a quadratic equation for the intake manifold purge flow rate Qim. Then, when this quadratic equation is solved, the intake manifold purge flow rate Qim satisfies the following Equation (8). In Equation (8), "A=1−K1²/K2²ⁿ", "B=−2×qprg", "C=qprg²+K1²×Pej−K1²×Pim" are satisfied.

$$Qim = \{-B \pm \sqrt{(B^2 - 4AC)}\}/2A \quad \text{Equation (8)}$$

By this Equation (8), the intake manifold purge flow rate Qim is obtained. In Equation (8), it is assumed that a case where a sign before the square root of a numerator is negative is a solution of the intake manifold purge flow rate Qim. Then, the obtained intake manifold purge flow rate Qim is substituted into Equation (4), so that the ejector purge flow rate Qej is obtained.

Figure 5:
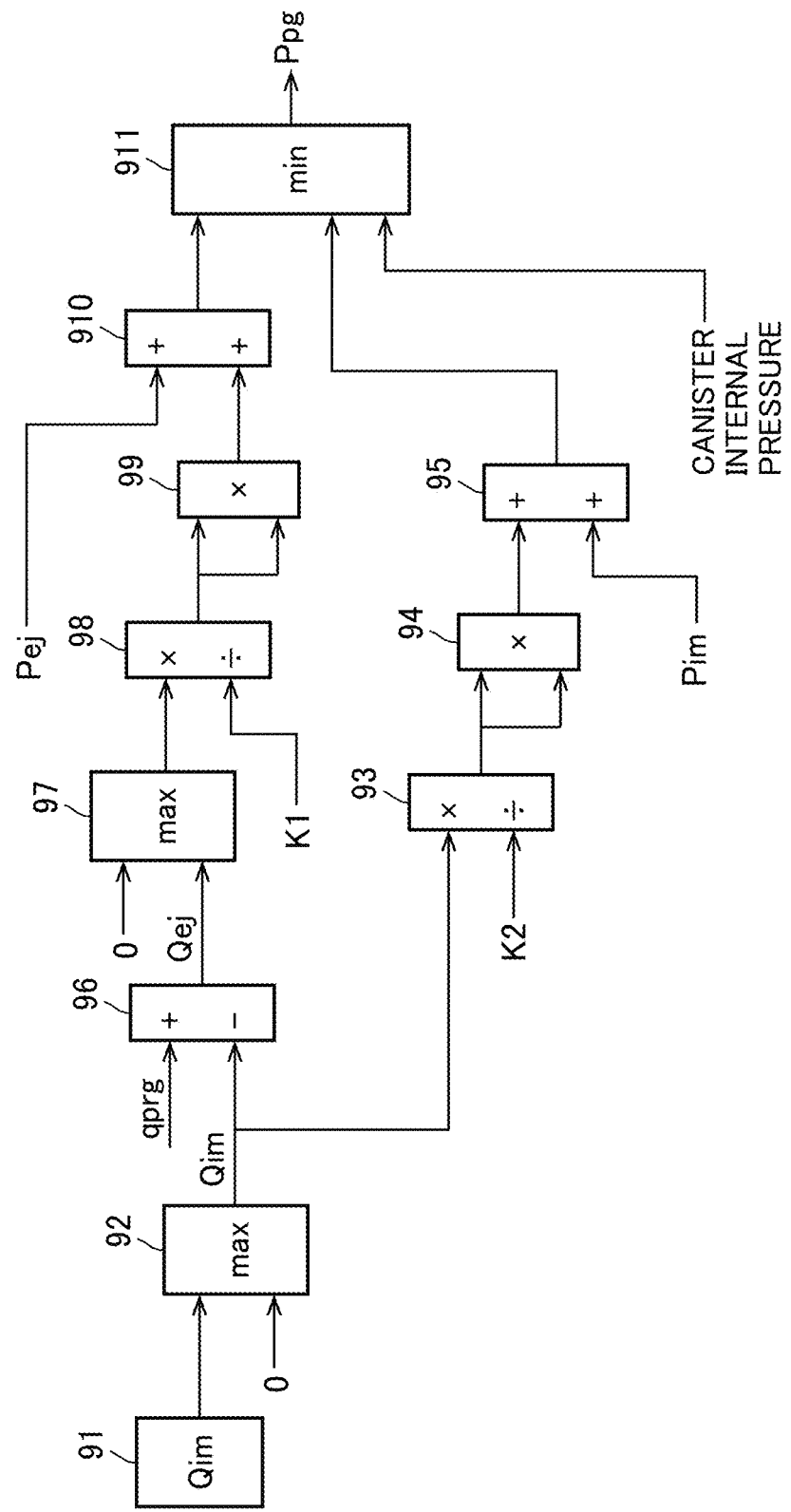
FIG. 5 is a block diagram illustrating a calculation method of a purge flow rate according to the embodiment of the present invention.

FIG. 5 is a block diagram specifically illustrating the calculation method of the purge flow rate according to the embodiment of the present invention. The PCM 70 has an operation circuit illustrated in FIG. 5.

The PCM 70 operates the intake manifold purge flow rate Qim in the Qim operation part 91. The Qim operation part 91 operates the intake manifold purge flow rate Qim on the basis of the above Equation (8). Herein, a constant K1 and a constant K2 are preset to be stored. Additionally, first pressure Pej is estimated on the basis of a pressure difference between the pressure on the upstream side of the compressor 4a and the pressure on the downstream side of the compressor 4a. To this pressure difference, a difference between supercharging pressure detected by the first pressure sensor 43, and the atmospheric pressure detected by the atmospheric pressure sensor 40 is applied. Additionally, to second pressure Pim, the intake manifold pressure detected by the second pressure sensor 45 is applied.

The PCM 70 compares a value obtained by a Qim operation part 91 with "0" by a maximum value acquisition part 92, and a larger value is determined as the intake manifold purge flow rate Qim. That is, there is a possibility that the intake manifold purge flow rate Qim calculated on the basis of Equation (8) becomes a negative value. The negative intake manifold purge flow rate Qim means that the pressure in the downstream end of the second branch passage 65 is higher than the pressure in the upstream end of the second branch passage 65, and the intake air flows backward in the second branch passage 65. However, in the actual second branch passage 65, the check valve 65a is provided, the intake air does not flow backward in the second branch passage 65, and the intake manifold purge flow rate Qim becomes 0. Therefore, in a case where the intake manifold purge flow rate Qim obtained by the Qim operation part 91 is a negative value, the negative value is substituted for 0 in the maximum value acquisition part 92.

The intake manifold purge flow rate Qim output from the maximum value acquisition part 92 is input to a multiplication/division part 93. To the multiplication/division part 93, the constant K2 is also input. The multiplication/division part 93 divides the intake manifold purge flow rate Qim by the constant K2. A value output from the multiplication/division part 93 (Qim/K2) is squared in a multiplication part 94. A value output from the multiplication part 94 (Qim/K2)² is input to an addition part 95, and the second pressure Pim is added in the addition part 95. Then, the branch part pressure Ppg is calculated from the addition part 95. The branch part pressure Ppg thus calculated is the branch part pressure Ppg based on Equation (5).

On the other hand, the intake manifold purge flow rate Qim output from the maximum value acquisition part 92 is input also to an addition/subtraction part 96. To the addition/subtraction part 96, the target purge flow rate qprg is also input. The addition/subtraction part 96 subtracts the intake manifold purge flow rate Qim from the target purge flow rate qprg, and calculates the ejector purge flow rate Qej. That is, the addition/subtraction part 96 obtains the ejector purge flow rate Qej from the intake manifold purge flow rate Qim and the target purge flow rate qprg (=total purge flow rate Qpg) on the basis of Equation (3).

The ejector purge flow rate Qej output from the addition/subtraction part 96 is input to a maximum value acquisition part 97, and is compared with "0", and a larger value is determined as the ejector purge flow rate Qej. That is, as a result of calculation of the ejector purge flow rate Qej from the intake manifold purge flow rate Qim calculated on the basis of Equation (8), the ejector purge flow rate Qej can be a negative value. The negative ejector purge flow rate Qej means that the pressure in the downstream end of the first branch passage 64 is higher than the pressure in the upstream end of the first branch passage 64, and the intake air flows backward in the first branch passage 64. However, in the actual first branch passage 64, the check valve 64a is provided, the intake air does not flow backward in the first branch passage 64, and the ejector purge flow rate Qej becomes 0. Therefore, in a case where the ejector purge flow rate Qej output from the addition/subtraction part 96 is a negative value, the negative value is substituted for 0 in the maximum value acquisition part 97.

The ejector purge flow rate Qej output from the maximum value acquisition part 97 is input to a multiplication/division part 98. The constant K1 is also input to the multiplication/division part 98. The multiplication/division part 98 divides the ejector purge flow rate Qej by the constant K1. A value output from the multiplication/division part 98 (Qej/K1) is squared in a multiplication part 99. A value output from the multiplication part 99 $(Qej/K1)^2$ is input to an addition part 910, and the first pressure Pej is added in the addition part 910. Then, the branch part pressure Ppg is calculated from the addition part 910. The branch part pressure Ppg thus calculated is the branch part pressure Ppg based on Equation (4).

Finally, in a minimum value acquisition part 911, when the branch part pressure Ppg output from the addition part 95, the branch part pressure Ppg output from the addition part 910, and the canister internal pressure (typically atmospheric pressure) are compared, a minimum value is determined as the branch part pressure Ppg. That is, in the middle of the calculation of the branch part pressure Ppg output from the addition part 95 or the addition part 910, the ejector purge flow rate Qej or the intake manifold purge flow rate Qim sometimes becomes negative. In this case, the flow rate is substituted for 0. That is, the ejector purge flow rate Qej or the intake manifold purge flow rate Qim is increased. When the ejector purge flow rate Qej or the intake manifold purge flow rate Qim is increased, as a result, the calculated branch part pressure Ppg shifts to be increased. Therefore, a smaller one of the branch part pressure Ppg output from the addition part 95, and the branch part pressure Ppg output from the addition part 910 can be regarded as more accurate branch part pressure. Additionally, the branch part pressure Ppg does not become the canister internal pressure (typically, atmospheric pressure) or more. Therefore, in a case where the branch part pressure Ppg output from the addition part 95, and the branch part pressure Ppg output from the addition part 910 are larger than the canister internal pressure, the canister internal pressure is determined as the branch part pressure Ppg.

Then, the PCM 70 estimates the total purge flow rate Qpg on the basis of the branch part pressure Ppg thus obtained, the canister internal pressure, and the opening degree of the purge valve 66.

<Time Chart>

Now, an example of a time chart in a case where the anomaly determination process for the evaporated fuel processing device according to this embodiment is performed will be described with reference to FIG. 6. FIG. 6 illustrates the opening/closing of the atmospheric opening valve 61c, the canister internal pressure (negative pressure), the pressure difference of the canister internal pressure, the purge flow rate per unit time, the integrated purge flow rate, ON/OFF of a normal determination flag, and ON/OFF of an anomaly determination flag in this order from above. Additionally, FIG. 6 illustrates a graph of a case where a solid line indicates that the evaporated fuel processing device 60 is normal, and a graph of a case where a broken line indicates that the evaporated fuel processing device 60 is anomalous.

First, at time t11, the anomaly determination execution condition of the evaporated fuel processing device 60 is established, and at time t12 right after this, the atmospheric opening valve 61c is closed. Additionally, canister internal pressure detected at this time is set to an initial value, calculation of the pressure difference of the canister internal pressure is started by using this initial value, and calculation of the integrated purge flow rate is started from the purge flow rate per unit time. Thereafter, in a case where the evaporated fuel processing device 60 is normal, the pressure difference of the canister internal pressure becomes a predetermined pressure P1 or more at time t13, and therefore even when the integrated purge flow rate does not reach a predetermined flow rate Q1, the normal determination flag which indicates that the evaporated fuel processing device 60 is normal is set to be turned on. Then, the atmospheric opening valve 61c is opened. On the other hand, in a case where the evaporated fuel processing device 60 is anomalous, the integrated purge flow rate becomes the predetermined flow rate Q1 or more at time t14, and the pressure difference of the canister internal pressure at this time is less than the predetermined pressure P1, and therefore the anomaly determination flag which indicates that the evaporated fuel processing device 60 is anomalous is set to be turned on. Then, the atmospheric opening valve 61c is opened.

<Effects>

Now, effects of the anomaly determination device for an evaporated fuel processing device according to the embodiment of the present invention will be described.

In this embodiment, the anomaly determination for the evaporated fuel processing device 60 is performed on the basis of the pressure difference (deviation) between the canister internal pressure (initial value) at the time of anomaly determination start, and the canister internal pressure when the integrated purge flow rate becomes the predetermined flow rate or more. Specifically, in a case where the pressure difference of the canister internal pressure is less than the predetermined pressure, it is determined that the evaporated fuel processing device 60 is anomalous. According to this embodiment, taking the change amount of the canister internal pressure in accordance with the purge flow rate into consideration, the anomaly determination is performed, and therefore, that is, the anomaly determination is performed by using a determination value (predetermined pressure) of the suitable canister internal pressure in accordance with the purge flow rate, and therefore it is possible to precisely perform the anomaly determination for the evaporated fuel processing device 60. For example, even in a case where the purge flow rate is small, the predetermined pressure for determining the canister internal pressure in accordance with this purge flow rate is used, and therefore it is possible to suitably suppress erroneous determination of the anomaly for the evaporated fuel processing device 60.

According to this embodiment, even in a case where the integrated purge flow rate does not reach the predetermined flow rate, when the pressure difference of the canister internal pressure becomes the predetermined pressure or more, it is determined that the evaporated fuel processing device 60 is normal, and therefore the anomaly determination for the evaporated fuel processing device 60 can be promptly terminated without waiting for the integrated purge flow rate to reach the predetermined flow rate.

According to this embodiment, the predetermined pressure for determining the pressure difference of the canister internal pressure is preset on the basis of the change amount of the canister internal pressure when the purge gas whose flow rate is the predetermined flow rate is purged in a state where the degree of the residual amount of fuel in the fuel tank 59 is 0%, and therefore determination can be performed by using the determination value (predetermined pressure) of more suitable canister internal pressure in accordance with the purge flow rate, and it is possible to reliably suppress the erroneous determination of the anomaly for the evaporated fuel processing device 60.

According to this embodiment, at the time of the anomaly determination for the evaporated fuel processing device 60, the atmospheric opening valve 61c is closed, and the inflow of the air from the atmospheric opening passage 61b to the canister 61 is blocked, and therefore it is possible to effectively improve precision of the anomaly determination for the evaporated fuel processing device 6. That is, it is possible to improve robustness of the anomaly determination.

In this embodiment, the anomaly determination for the ejector purge performed at the time of supercharging by the turbo supercharger 4 is performed, that is, the anomaly determination is performed during the ejector purge. In principle, the ejector purge is performed at the time of supercharging, and therefore the anomaly determination for the ejector purge is performed at the time of supercharging. Generally, a series of supercharging period by the turbo supercharger 4 is short (that is, supercharging/non-supercharging by the turbo supercharger 4 tends to be relatively often switched), and therefore in a case where the anomaly determination for the ejector purge is performed, the anomaly determination needs to be completed for a short time. Herein, in a general natural intake air type system, intake manifold purge is performed. However, this anomaly determination for the intake manifold purge is performed by determining whether or not the canister internal pressure reaches the predetermined pressure when the intake manifold purge is performed, for example. However, when such a method is applied to the ejector purge, it takes time until the canister internal pressure reaches the predetermined pressure, and the anomaly determination tends not to be able to be suitably completed for the short supercharging period. On the other hand, according to this embodiment, as described above, the integrated purge flow rate is sequentially calculated, and a suitable predetermined flow rate is defined, the anomaly determination is performed on the basis of the canister internal pressure when the integrated purge flow rate becomes the predetermined flow rate or more, and therefore it is possible to suitably complete the anomaly determination in a relatively short supercharging period. Therefore, according to this embodiment, it is possible to suitably perform the anomaly determination for the ejector purge.

In this embodiment, the branch part pressure which is the pressure in the branch part of the first branch passage 64 and the second branch passage 65 in the purge passage 62 is obtained on the basis of the first pressure that is the pressure in the downstream end of the first branch passage 64, the second pressure that is the pressure in the downstream end of the second branch passage 65, and the like, and the purge flow rate per unit time is calculated on the basis of this branch part pressure, the opening degree of the purge valve 66, and the canister internal pressure, and therefore it is possible to precisely calculate the purge flow rate.

<Modification>

In the above embodiment, the canister internal pressure at the time of anomaly determination start is set to the initial value, the anomaly determination for the evaporated fuel processing device 60 is performed on the basis of the magnitude of the pressure difference (deviation) between this initial value, and the canister internal pressure when the integrated purge flow rate becomes the predetermined flow rate or more. However, in another example, the anomaly determination for the evaporated fuel processing device 60 may be performed on the basis of only the magnitude of the canister internal pressure when the integrated purge flow rate becomes the predetermined flow rate or more, in place of use of such pressure difference of the canister internal pressure. In this case, in a case where the canister internal pressure (negative pressure, that is, a negative value) when the integrated purge flow rate is the predetermined flow rate or more, it may be determined that the evaporated fuel processing device 60 is anomalous. Consequently, the change amount of the canister internal pressure in accordance with the purge flow rate is suitably taken into consideration, and therefore it is possible to precisely perform the anomaly determination for the evaporated fuel processing device 60.

In the above embodiment, the present invention is applied to the ejector purge, that is, during the ejector purge (particularly, at the time of supercharging), the anomaly determination for the evaporated fuel processing device 60 is performed. In another example, the present invention may be applied to intake manifold purge, that is, during the intake manifold purge (particularly, at the time of non-supercharging) the anomaly determination for the evaporated fuel processing device 60 may be performed. In this case, the integrated purge flow rate only needs to be obtained from the purge flow rate per unit time by the intake manifold purge, and the anomaly determination for the evaporated fuel processing device 60 only needs to be performed on the basis of the canister internal pressure when this integrated purge flow rate becomes the predetermined flow rate or more.

In the above embodiment, purge downstream pressure (such as supercharging pressure and intake manifold pressure) that is the pressure on the intake passage 1 on the downstream side of the purge passage 62, canister internal pressure, and the like are detected by the sensors. However, the present invention is not limited to detection by these sensors, and estimation may be performed by using a predetermined model.

In the above embodiment, the present invention is applied to the evaporated fuel processing device 60 configured to perform both the ejector purge and the intake manifold purge. However, the present invention may be applied to an evaporated fuel processing device configured to perform only the ejector purge (that is, an evaporated fuel processing device that does not include the second branch passage 65 as a purge passage but includes only the first branch passage 64).

While the present invention is applied to a gasoline engine in the above embodiment, the present invention may be applied to a diesel engine.

LIST OF REFERENCE SIGNS

1 intake passage
4 turbo supercharger
7 surge tank
10 engine
25 exhaust passage
40 atmospheric pressure sensor
43 first pressure sensor
45 second pressure sensor
53 third pressure sensor
59 fuel tank
60 evaporated fuel processing device
61 canister
61b atmospheric opening passage
61c atmospheric opening valve
62 purge passage 64 first branch passage
65 second branch passage
66 purge valve
67 ejector
70 PCM
100 engine system

The invention claimed is:

1. An anomaly determination device for an evaporated fuel processing device, comprising:
   an evaporated fuel processing device comprising: a canister operable to adsorb and accumulate evaporated fuel in a fuel tank; a purge passage operable to supply an intake passage with purge gas including the evaporated fuel accumulated in the canister; and a purge valve provided on the purge passage and operable to control a supply of the purge gas to the intake passage;
   a purge downstream pressure acquisition part configured to acquire a purge downstream pressure which is a pressure in the intake passage on a downstream side of the purge passage;
   a first purge flow rate calculation part configured to calculate a first purge flow rate which is a flow rate of purge gas per unit time purged to the intake passage by the evaporated fuel processing device, on the basis of the purge downstream pressure acquired by the purge downstream pressure acquisition part and an opening degree of the purge valve;
   a second purge flow rate calculation part configured to calculate a second purge flow rate which is a flow rate of purge gas continuously purged to the intake passage by the evaporated fuel processing device, based on the first purge flow rate calculated by the first purge flow rate calculation part;
   a canister internal pressure acquisition part configured to acquire a canister internal pressure which is an internal pressure of the canister; and
   an anomaly determination part configured to perform an anomaly determination for the evaporated fuel processing device on the basis of the second purge flow rate calculated by the second purge flow rate calculation part and the canister internal pressure acquired by the canister internal pressure acquisition part,
   wherein the second purge flow rate calculation part is configured to calculate a flow rate of the purge gas continuously purged to the intake passage by the evaporated fuel processing device after a start of the anomaly determination, as the second purge flow rate, and
   wherein the anomaly determination part is configured to perform the anomaly determination on the basis of the canister internal pressure which is acquired by the canister internal pressure acquisition part when the second purge flow rate becomes a predetermined flow rate or more.

2. The anomaly determination device for an evaporated fuel processing device according to claim 1, wherein the anomaly determination part is configured to determine that the evaporated fuel processing device is anomalous, in a case where a magnitude of a deviation between the canister internal pressure acquired by the canister internal pressure acquisition part at the time of the start of the anomaly determination, and the canister internal pressure acquired by the canister internal pressure acquisition part when the second purge flow rate becomes the predetermined flow rate or more is less than a predetermined pressure.

3. The anomaly determination device for an evaporated fuel processing device according to claim 2, wherein the anomaly determination part is configured to determine that the evaporated fuel processing device is normal, even in a case where the second purge flow rate does not reach the predetermined flow rate, when the magnitude of the deviation between the canister internal pressure acquired by the canister internal pressure acquisition part at the time of the start of the anomaly determination, and the canister internal pressure acquired by the canister internal pressure acquisition part after the start of the anomaly determination becomes the predetermined pressure or more.

4. The anomaly determination device for an evaporated fuel processing device according to claim 2, wherein the predetermined pressure is preset on the basis of a change amount of the canister internal pressure when the purge gas of the predetermined flow rate is purged to the intake passage by the evaporated fuel processing device that is normal in a state where a residual amount of fuel in the fuel tank is substantially 0.

5. The anomaly determination device for an evaporated fuel processing device according to claim 1,
   wherein the evaporated fuel processing device is communicated with the canister, and further includes an atmospheric opening passage operable to supply air to the canister, and an atmospheric opening valve provided on the atmospheric opening passage and operable to control a supply of the air to the canister, and
   wherein the anomaly determination part is configured to start the anomaly determination after the atmospheric opening valve is closed.

6. The anomaly determination device for an evaporated fuel processing device according to claim 1,
   wherein the anomaly determination device for the evaporated fuel processing device is applied to an engine with a turbo supercharger including a compressor provided on the intake passage and a turbine provided on the exhaust passage,
   wherein the evaporated fuel processing device includes an ejector that is connected to a compressor downstream side and a compressor upstream side of the intake passage, and generates a negative pressure by flow of intake air returned from the compressor downstream side to the compressor upstream side,
   wherein the purge passage has a downstream end connected to the ejector, and purges the purge gas to the intake passage by utilizing the negative pressure generated by the ejector, and
   wherein the anomaly determination part is configured to perform the anomaly determination when the purge gas is being purged to the intake passage from the purge passage through the ejector.

7. The anomaly determination device for an evaporated fuel processing device according to claim 1,
   wherein the anomaly determination device for the evaporated fuel processing device is applied to an engine with a turbo supercharger including a compressor provided on the intake passage, and a turbine provided on the exhaust passage,
   wherein the evaporated fuel processing device includes an ejector that is connected to a compressor downstream side and a compressor upstream side of the intake passage, and generates a negative pressure by flow of intake air returned from the compressor downstream side to the compressor upstream side,
   wherein the purge passage is branched into a first branch passage that has a downstream end connected to the ejector and purges the purge gas to the intake passage by utilizing the negative pressure generated by the ejector, and a second branch passage that has a downstream end connected to the intake passage on a further downstream side with respect to a position where the ejector is connected to the intake passage on the compressor downstream side, the second branch passage being operable to purge the purge gas to the intake passage by utilizing the negative pressure generated at the downstream end of the second branch passage, and wherein the anomaly determination part is configured to perform the anomaly determination when the purge gas is being purged to the intake passage from the first branch passage through the ejector.

8. The anomaly determination device for an evaporated fuel processing device according to claim 7, wherein the purge downstream pressure acquisition part acquires a first pressure that is a pressure in the downstream end of the first branch passage, and a second pressure that is a pressure in the downstream end of the second branch passage, as the purge downstream pressure, and wherein the first purge flow rate calculation part is configured to calculate a branch part pressure that is a pressure in a branch part of the first branch passage and the second branch passage in the purge passage, on the basis of the first pressure and the second pressure, and to calculate the first purge flow rate on the basis of the branch part pressure, the opening degree of the purge valve and the canister internal pressure.

9. The anomaly determination device for an evaporated fuel processing device according to claim 1, wherein the second purge flow rate calculation part is configured to calculate the second purge flow rate by integrating the first purge flow rate calculated by the first purge flow rate calculation part.

10. An anomaly determination device for an evaporated fuel processing device, comprising:

an evaporated fuel processing device comprising: a canister operable to adsorb and accumulate evaporated fuel in a fuel tank; a purge passage operable to supply an intake passage with purge gas including the evaporated fuel accumulated in the canister; and a purge valve provided on the purge passage and operable to control a supply of the purge gas to the intake passage; and one or more processors configured to:

acquire a purge downstream pressure from a pressure sensor that detects a pressure in the intake passage on a downstream side of the purge passage;

calculate a first purge flow rate which is a flow rate of purge gas per unit time purged to the intake passage by the evaporated fuel processing device, on the basis of the purge downstream pressure and an opening degree of the purge valve;

calculate a second purge flow rate which is a flow rate of purge gas continuously purged to the intake passage by the evaporated fuel processing device, based on the first purge flow rate;

acquire a canister internal pressure from a pressure sensor that detects an internal pressure of the canister; and perform an anomaly determination for the evaporated fuel processing device on the basis of the second purge flow rate and the canister internal pressure, wherein the one or more processors are configured to calculate a flow rate of purge gas continuously purged to the intake passage by the evaporated fuel processing device after a start of the anomaly determination, as the second purge flow rate, and to perform the anomaly determination on the basis of the canister internal pressure which is acquired when the second purge flow rate becomes a predetermined flow rate or more.

* * * * *